United States Patent
Song (10) Patent No.: US 7,563,059 B2
(45) Date of Patent: Jul. 21, 2009

(54) SINUSOIDAL ANGLED ROTARY CUTTING TOOL

(75) Inventor: Ho Keun Song, Incheon (KR)

(73) Assignee: YG-1 Co., Ltd., Pupyoung-Gu, Incheon (KR)

( * ) Notice: Subject to any disclaimer, the term of this patent is extended or adjusted under 35 U.S.C. 154(b) by 74 days.

(21) Appl. No.: 11/379,750

(22) Filed: Apr. 21, 2006

(65) Prior Publication Data

US 2007/0248422 A1    Oct. 25, 2007

(51) Int. Cl.
 *B23C 5/10* (2006.01)
(52) U.S. Cl. .......................................... 407/53; 407/61
(58) Field of Classification Search ............. 407/54–64, 407/120; *B23C 5/10*
 See application file for complete search history.

(56) References Cited

U.S. PATENT DOCUMENTS

| | | | |
|---|---|---|---|
| 1,840,852 A | | 1/1932 | Schotthoefer |
| 2,188,743 A | * | 1/1940 | Severson ...................... 407/49 |
| 2,782,490 A | * | 2/1957 | Graves ........................ 407/63 |
| 3,133,339 A | | 5/1964 | Ribich |
| 3,775,819 A | * | 12/1973 | Ribich ......................... 407/53 |
| 4,212,568 A | * | 7/1980 | Minicozzi ..................... 407/53 |
| 4,560,308 A | | 12/1985 | Deller |
| 4,963,059 A | | 10/1990 | Hiyama |
| 5,586,843 A | | 12/1996 | Minicozzi |
| 5,779,399 A | | 7/1998 | Kuberski |
| 5,913,644 A | | 6/1999 | DeRoche et al. |
| 6,899,494 B2 | | 5/2005 | Walrath |
| 6,991,409 B2 | | 1/2006 | Noland |
| 6,997,651 B2 | * | 2/2006 | Kawai et al. .................. 407/53 |
| 2003/0118411 A1 | * | 6/2003 | Flynn et al. ................... 407/53 |
| 2004/0057803 A1 | | 3/2004 | Walrath |
| 2004/0120777 A1 | | 6/2004 | Noland |
| 2004/0170480 A1 | | 9/2004 | Kawai et al. |
| 2004/0258489 A1 | * | 12/2004 | Volokh ........................ 407/53 |
| 2005/0105973 A1 | | 5/2005 | MacArthur |
| 2007/0122241 A1 | * | 5/2007 | Sichi et al. ..................... 407/54 |

FOREIGN PATENT DOCUMENTS

FR    2563134 A1  *  10/1985

(Continued)

OTHER PUBLICATIONS

OSG Inc., Best Kut Brochure, Best Kut End Mill, 2 pages, Toyokawa City, Aich Providence.

(Continued)

*Primary Examiner*—Boyer D Ashley
*Assistant Examiner*—Sara Addisu
(74) *Attorney, Agent, or Firm*—Vedder Price, P.C.

(57) ABSTRACT

It is the object of the present disclosure to provide an improved end mill that can be easily manufactured, reduces cutting forces on the driving tool, limits chatter at high rotation speeds, has better stability, produces smoother cutting surfaces, and has less natural resonating frequencies while in use to permit operation of the end mill over a wider range of operating conditions. The end mill is equipped with a series of sinusoidal cutting edges with a single long pitch arranged regularly or irregularly along the circumferential cutting surface. In another embodiment, the pitch, the cutting angle of the datum line of the sinusoidal cutting edges and the amplitude of the sinusoidal function can be varied.

37 Claims, 10 Drawing Sheets

FOREIGN PATENT DOCUMENTS

| | | | | |
|---|---|---|---|---|
| JP | 57054019 | A | * | 3/1982 |
| JP | 2002233910 | A | * | 8/2002 |

OTHER PUBLICATIONS

Dura-Mill, WhisperKut Brochure, Two Revolutionary New End Mill Designs from Dura-Mill, 4 pages, Malta, New York.

Hanita Cutting Tools, VariMill Brochure, 4 pages, New Jersey.

Fullerton Tool Company, Fullerton Tool's New Line of Advanced Performance End Mills Brochure, 2 pages, Saginaw, Michigan.

SGS Tool Company, Catalog EDP No. 00071, Sep. 2000, 4 pages, Munroe Falls, Ohio.

Thomas A. Ribich, "Design and Evaluation of High Speed Steel End Mills," May 1976, pp. 74-87.

Ulrich Ebel, "Resharpening Sinusoidal Wave Endmills," Cutting Tool Engineering, Jun. 1992, pp. 20-21.

Technical Data On 3 Fluted Crest-Kut End Mills For Titanium, 2 pages.

* cited by examiner

*Prior Art*

*Prior Art*

SINUSOIDAL ANGLED ROTARY CUTTING TOOL

FIELD OF THE DISCLOSURE

The present disclosure is directed toward the art of rotary cutting tools and to that class of tools known as end milling cutters. More specifically, the subject disclosure is directed to a low resonance end mill having a plurality of sinusoidal circumferential cutting edges.

BACKGROUND

High-speed rotating cutting tools are used in the process of metal removal. One of the primary goals in the design of end mills is to produce a cutting surface capable of rapidly removing substantial quantities of material while leaving a comparatively smooth surface on the workpiece. It is also desirable to minimize the cutting efforts in order to lower the power requirement for the driving tool.

Smoothness of a surface is obtained if the cutting surface of the end mill remains straight and does not vibrate during use. Vibrations of an elongated straight body create unwanted curvature along its principal axis. Vibrations of a rotating cutting tool, often called "chatter" or "ringing," are caused by the tool body being excited at its natural frequency or harmonics of this frequency by alternating and rotating load forces. To obtain a smooth surface, it is preferable to design an end mill with limited chatter. An end mill operating at a fixed rotation speed with numerous cutting edges is subject to load forces associated with the removal of layers of material from the workpiece. One solution to this problem is to design a better end mill with a cutting surface for removing material from a surface while removing primary and harmonic load frequencies associated with the tool's own frequency and associated harmonics.

One type of conventional tool is a rotating cutting tool where the radial distance of each cutting edge away from the longitudinal axis of rotation of the tool varies along the cutting height. The cutting edges, if used individually, even if used at high speed, leave an uneven surface on the material. The tools thus require the use of succeeding circumferential cutting edges with similar cutting edges but at varying distances along the longitudinal to semiflat cutting surface.

Figures 1A, 1B:
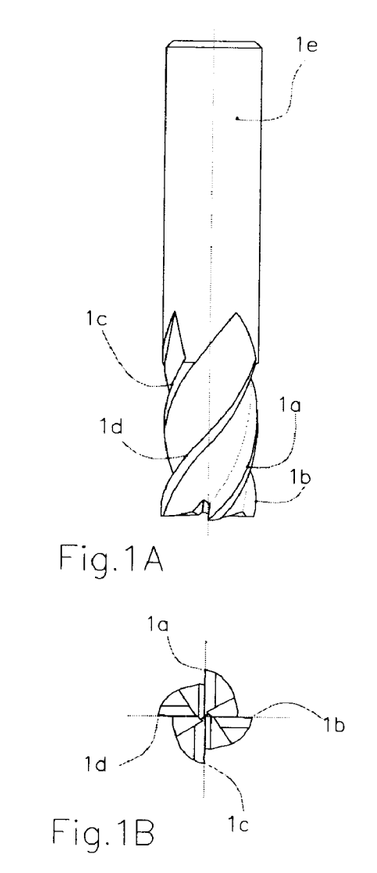
FIG. 1A is a side elevation view of an end mill according to a first embodiment of the prior art with equally spaced straight circumferential cutting edges.
FIG. 1B is an end view of the end mill of FIG. 1A.
Figure 1C:
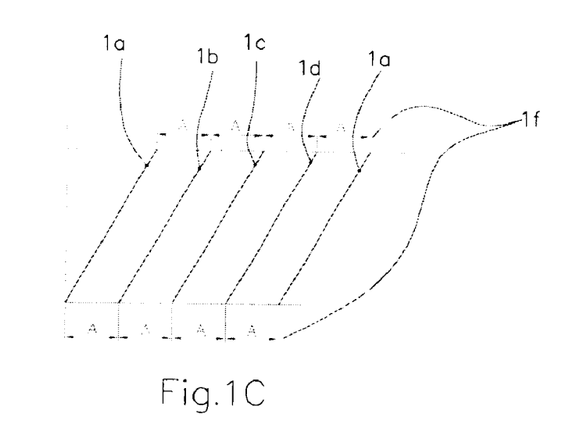
FIG. 1C is a schematic development view of the end mill of FIG. 1A showing the disposition of circumferential cutting edges on the developed cutting surface.

Another type of conventional end mill as shown in FIGS. 1A to 1C has cutting edges that do not vary away from the longitudinal axis but are arranged in a helix shape disposed at regular steps A along the circumference of the end mill. These types of cutting edges are regular and contact the material at a fixed angle determined by the cutting angle of the helix. The resulting load forces on each cutting edge are the same at different time intervals and result in the creation of resonating effects at certain cutting speeds.

Figure 2A:
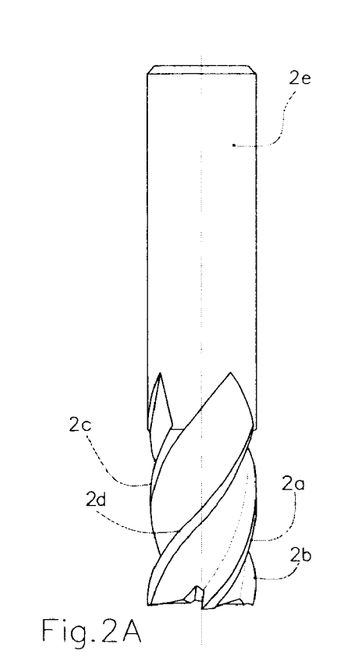
FIG. 2A is a side elevation view of an end mill according to a second embodiment of the prior art with unequally spaced straight circumferential cutting edges.
Figure 2B:
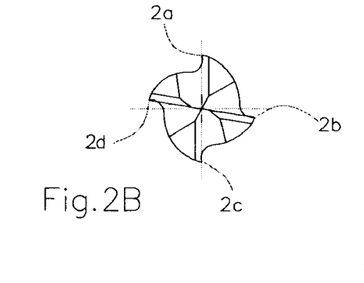
FIG. 2B is an end view of the end mill of FIG. 2A.
Figure 2C:
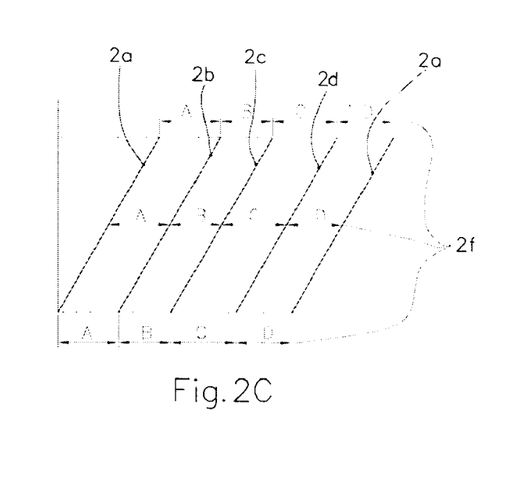
FIG. 2C is a schematic development view of the end mill of FIG. 2A showing the disposition of circumferential cutting edges on the developed cutting surface.

Still another type of conventional end mill as shown in FIGS. 2A to 2C has cutting edges that are not disposed at regular distances along the circumference of the end mill. As a result, while the direction of the load forces remain perpendicular to the cutting edge, and thus perpendicular to the cutting angle, the time intervals between changes alternate a first load frequency.

Figure 3A:
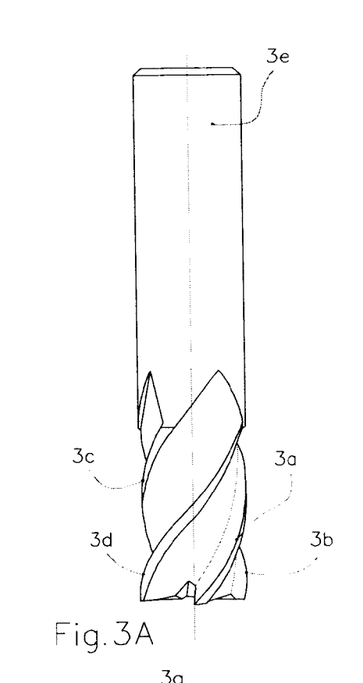
FIG. 3A is a side elevation view of an end mill according to a third embodiment of the prior art with a varied first cutting angle and a straight circumferential cutting edge.
Figure 3B:
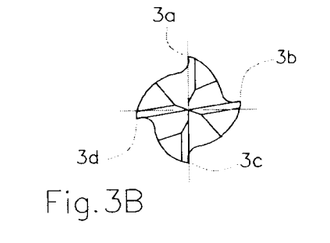
FIG. 3B is an end view of the end mill of FIG. 3A.
Figure 3C:
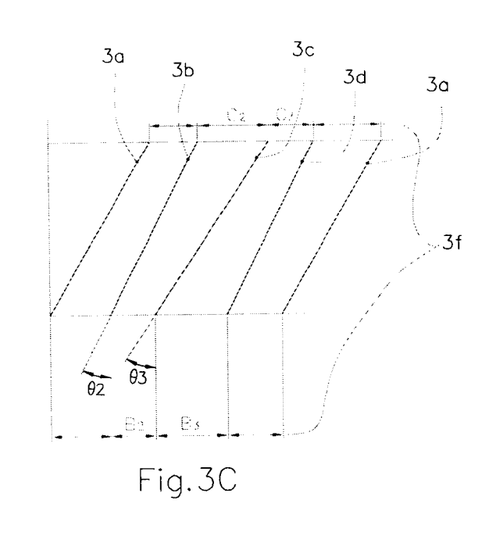
FIG. 3C is a schematic development view of the end mill of FIG. 3A showing the disposition of circumferential cutting edges on the developed cutting surface.

Yet still another type of conventional end mill as shown in FIGS. 3A to 3C shows that some of the cutting angles of the cutting edges are modified. This configuration allows for the attenuation of a second type of load frequencies associated with the direction of the load forces on the cutting edge. This change results in the transfer of a varying quantity of energy in the longitudinal axis. Nevertheless, this prior art maintains a constant cutting angle for each cutting edge. Understandably, as the end mill rotates, the load force moves up the cutting edge as the cutting surface removes material and the load force, as it evolves up the longitudinal axis, remains constant and thus creates unwanted resonance.

Figure 4A:
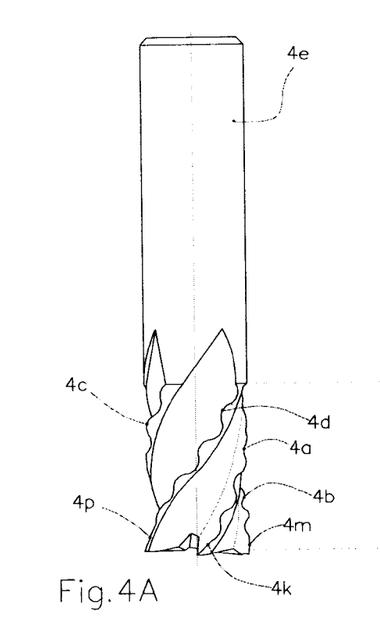
FIG. 4A is a side elevation view of an end mill according to a fourth embodiment of the prior art with equally spaced datum lines of a wobbling circumferential cutting edge.
Figure 4B:
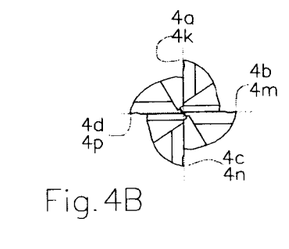
FIG. 4B is an end view of the end mill of FIG. 4A.
Figure 4C:
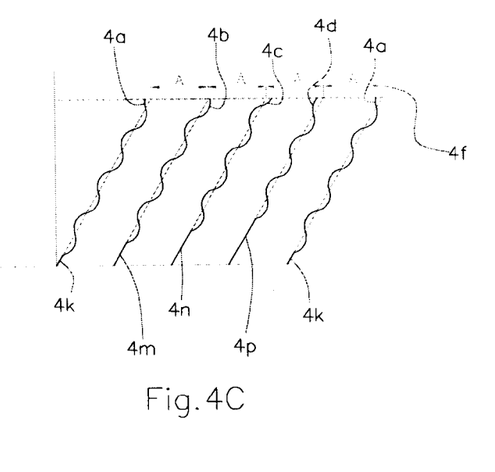
FIG. 4C is a schematic development view of the end mill of FIG. 4A showing the disposition of circumferential cutting edges on the developed cutting surface.

Another type of conventional end mill as shown in FIGS. 4A to 4C tries to limit a third type of load frequency by creating a plurality of small waves cut into the cutting edge in an attempt to modulate the load force as it migrates up along the cutting surface in the longitudinal axis. This configuration does not remove all unwanted frequencies since the load force alternatively evolves along cycles. In fact, it creates a new type of cycling load associated with the pitch of the small waves. In FIG. 4C, along the cutting edge 4a, the load force will return to the same angle four times as it progresses along the length of the fluted area. The effective cutting angle rapidly evolves over a short distance, creating unwanted shear forces in the longitudinal axis that increase the cutting effort needed on the tool, which may also damage the cutting edge.

What is needed is an end mill that reduces unwanted vibrations based on creation of noncyclic loading. A nonchattering or harmonically stable tool would limit damage to the end mill, provide a more polished finished surface, and limit the cutting effort needed to operate the cutting tool. The end mill must also be easy to manufacture and not present local weaknesses to shear forces.

SUMMARY

It is the object of the present disclosure to provide an improved end mill that can be easily manufactured, reduces cutting forces on the driving tool, limits chatter at high rotation speeds, has better stability, produces smoother cutting surfaces, and has less natural resonating frequencies while in use to permit operation of the end mill over a wider range of operating conditions.

The end mill may be equipped in one embodiment with a series of sinusoidal cutting edges with a single long pitch arranged regularly or irregularly along the circumferential cutting surface. Each cutting edge is located along a datum line that may be inclined at a fixed or a variable first cutting angle. The pitch of each cutting edge may also be fixed or variable. The phase angle between two consecutive sinusoidal cutting edges on the cutting surface can be staggered, regular, or in phase with other cutting edges.

The properties of a sinusoidal cutting edge shape are unique. The properties correspond to a known shape, which is easy to manufacture, where the cutting angle and the variation of the cutting angle defined as the load and the force change speed of the load force vary irregularly as it evolves with the tool rotation up the cutting edge according to a variable function. In addition, sinusoidal shapes are easy to stagger and design with phase shift from other cutting edges. Fundamental resonating harmonics are reduced aside from a possible voluntary arrangement of opposite or alternating cutting edge along the circumferential cutting surface.

In another embodiment, the pitch and amplitude of the sinusoidal function can be varied to create a plateau region within the cutting length forming a stronger mechanical region within the length of the cutting surface and changing residual harmonics from above or below the plateau region.

DETAILED DESCRIPTION

Figures 5A, 5B:
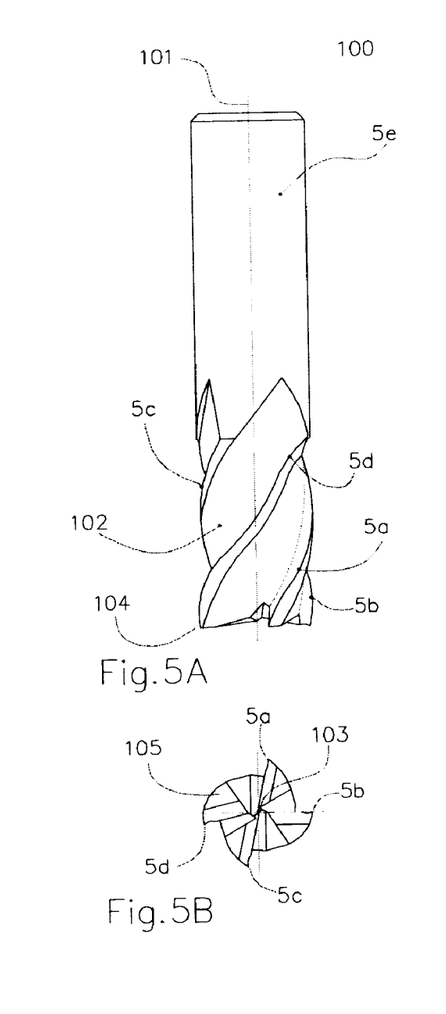
FIG. 5A is a side elevation view of an end mill according to a first embodiment of this disclosure with equally spaced datum lines of a sinusoidal circumferential cutting edges.
FIG. 5B is an end view of the end mill of FIG. 5A.
Figure 5C:
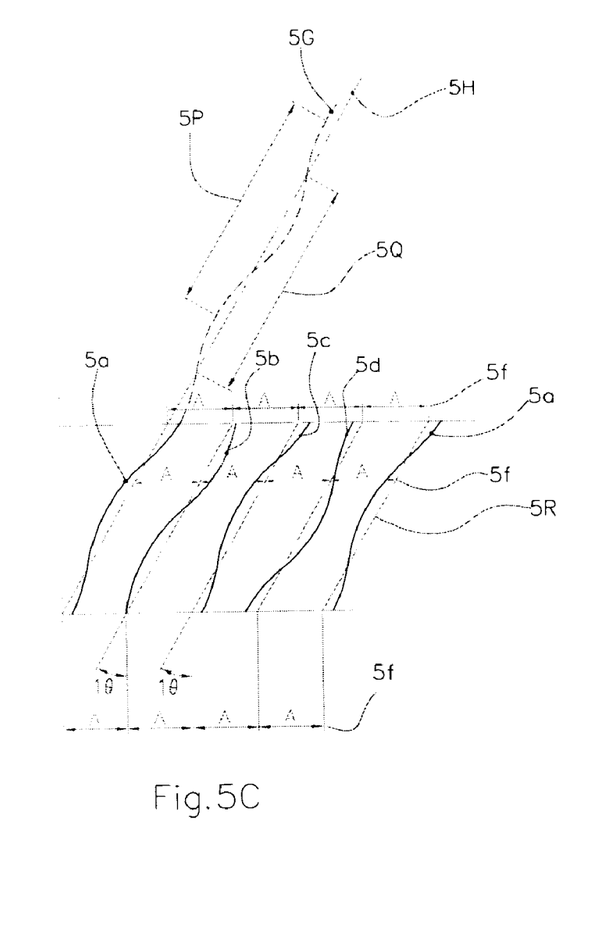
FIG. 5C is a schematic development view of the end mill of FIG. 5A showing the disposition of circumferential cutting edges on the developed cutting surface.

FIGS. 5A to 5C illustrate an end mill with four cutting edges in accordance with a first embodiment of the present disclosure. The end mill has equally spaced datum lines with sinusoidal cutting edges on the circumference of the cutting surface.

The end mill comprises a cylindrical tool body 100 having a longitudinal central axis 101. The end mill in the preferred embodiment may be used, for example, in the precision machining industry. The end mill comprises a single fluted cutting end 102 and a shank end 5e formed in opposition in the cylindrical body, the shank end having a shank extending along the longitudinal central axis. It is recognized by one of ordinary skill in the art that while a square end mill is shown (e.g., an end mill with a flat end cutting surface), any other end is possible, such as a ball nose, a radius tip, a chamfer end, or the like. The end mill as disclosed is also not made for a single type of material removal. The preferred embodiment can be used, for example, on a precision machine for finishing, on a machine for roughing, or even for logging. It is also understood by one of ordinary skill in this art that a plurality of normal variable volumetric, composition, and design parameters can be modified according to the precise needs of the industry without affecting the scope and breadth of this disclosure. These parameters include, but are not limited to, the cutting edge angle, tip design, end mill diameters, shank length, shank diameter, cutting surface length, overall length, number of cutting edges, radial size, tip cutting edge design, and even cutting angles on the circumferential cutting edges.

It is be understood by one of ordinary skill in the art that end mills can be made of a large variety of materials including, but not limited to, carbide, microgram carbide, ceramic, cobalt, high-speed steel, low-carbon steel, alloy steel, cast iron, stainless steel, titanium alloys, high-temperature alloys, diamonds, or other material equally suited for this type of use. In addition, it is understood that end mills may be coated to obtain extra resistance and improved mechanical properties. These coatings may include, but are not limited to, titanium nitride, titanium carbonitride, titanium aluminum nitride, aluminum titanium nitride, aluminum oxide, chromium nitride, zirconium nitride, and diamond.

The surface of the fluted cutting end 102 defines a circumferential cutting surface extending along the longitudinal central axis 101 of rotation adjacent to the shank end 5e. While the actual cutting surface is understood by one of ordinary skill in the art to constitute the actual external surface of the fluted cutting end, the effective cutting surface defined herein as shown in FIGS. 1C, 2C, 3C, 4C, 5C, 6C, 7C, 8C, 9C, and 10C relates to the "circumferential cutting surface" as referred to herein, a development of the actual cutting surface as projected on a cylinder of the dimensions of the shank. It is understood by one of ordinary skill in the art that the terms "circumferential cutting surface" and "actual external surface" are associated and may be used interchangeably in this disclosure since they relate to functional equivalents. The circumferential cutting surface development as shown is customary in this art.

To better describe each preferred embodiment over the prior art, a uniform end mill illustration made of three views is used: a side elevation view (View A), an end view (View B), and a schematic development (View C). Consistent reference numbers are used. While the end mill 100 and other general elements are not numbered on each figure, it is understood by one of ordinary skill in the art that these reference numbers may be used for each figure. The circumferential cutting surface further comprises a plurality of circumferentially spaced cutting edges shown as 5a, 5b, 5c, and 5d on FIGS. 5A-5C. Each cutting edge extends generally along a datum line 5r oriented at a first cutting angle 5θ on the circumferential cutting edge shown in FIG. 5C. Each cutting edge 5a to 5d is located on a contour centered about the datum line 5r in the shape of a pitch of a sinusoidal wave. It will be understood by one of ordinary skill in this art that the pitch refers to the period of the sinusoidal wave. The datum line also coincides with the oscillating center of the sinusoidal wave. The first cutting angle 5θ is defined as the angle between the datum line 5r on the cutting surface of a cutting edge 5a to 5d and the longitudinal central axis 101.

FIGS. 5A to 5C show an embodiment where the datum lines 5r are regularly spaced about the circumferential cutting surface as shown by the letter A, and where the first cutting angle 5θ is constant for each cutting edge 5a to 5d. The sinusoidal wave can also be further defined by the circumferential amplitude of the cutting edge to the datum line. A low-amplitude sinusoidal wave 5a, for example, would displace the average cutting edge closer to the datum line 5r, and a high-amplitude sinusoidal wave 5a would move the cutting edge closer to the adjacent cutting edges 5c and 5a on the circumferential cutting surface as shown on FIG. 5C. In the embodiment shown on FIGS. 5A to 5C, the circumferential amplitude of each cutting edge remains constant so that only a fraction of the regular space between two datum lines 5r.

Another feature of a cutting edge located along a sinusoidal wave is the existence of a phase between different cutting edges on the same cutting surface. FIGS. 5A to 5C illustrate a preferred embodiment where the cutting edge 5a is in phase with the cutting edge 5c. It is understood that two cutting edges are in phase when they have the same profile at the same distance along the longitudinal axis of the fluted end. It is understood by one of ordinary skill in the art that a sinusoidal function may be described as follows:

Amplitude=Maximum Amplitude×sin (angle)

The maximum amplitude is defined as the greatest distance of the cutting edge to a circumferential cutting edge datum line. The amplitude is the distance along the cutting edge from the datum line and the angle is an angle from zero to 360 degrees if a wave of one pitch is shown over the cutting surface. The phase shift between a pair of cutting edges is defined as the difference in angle between two cutting edges to place the maximum amplitude at the same distance along the longitudinal axis of the fluted end. A phase shift of 180 degrees, illustrated as the difference between wave 5p and wave 5q, corresponds to a situation where the maximum amplitude of a first cutting edge coincides along the longitudinal axis 101 to the minimum amplitude of the second cutting edge.

While FIG. 5C shows a situation where the cutting edge 5d seems to have a phase shift of 180 degrees with cutting edge 5d or 5a, it is understood by one of ordinary skill in the art that the figure is only illustrative of a situation where any possible phase or amplitude is can be used.

The fluted cutting end 102 has a nose 103, a periphery 104, and an end surface extending from the nose 103 to the periphery 104. The end surface, shown on FIGS. 5A and 5B as a flat surface, has in a preferred embodiment a radial cutting surface extending along a perpendicular plane to the longitudinal central axis 101. FIGS. 5A and 5B also show a preferred embodiment where the cutting edges are located on the periphery 104 at such a distance that the pair of cutting edges 5a and 5c do not have a phase shift and are located on opposite locations about the periphery 104 on each side of the longitudinal central axis 101. As a result, each cutting edge is located on a contour centered about the datum line in the shape of a pitch of a sinusoidal wave, and the single sinusoidal wave is staggered in relation to neighboring circumferentially spaced cutting edges along a phase shift.

Figures 6A, 6B:
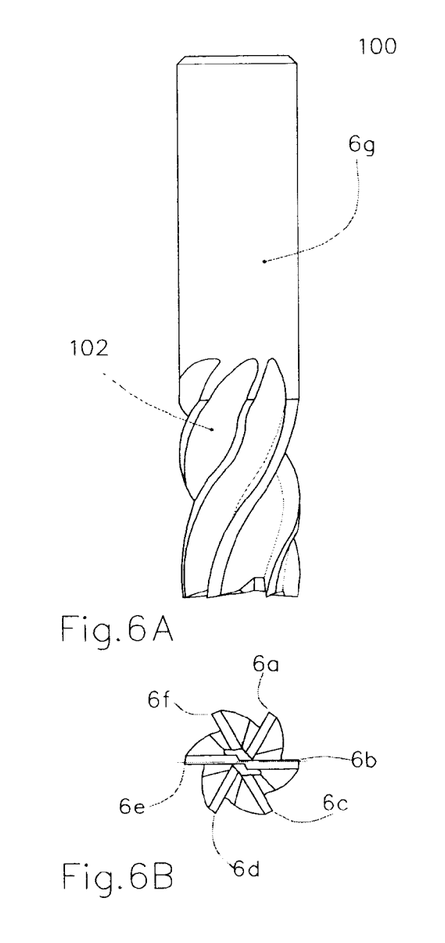
FIG. 6A is a side elevation view of an end mill according to a second embodiment of this disclosure with one phased pair of opposite sinusoidal circumferential cutting edges.
FIG. 6B is an end view of the end mill of FIG. 6A.
Figure 6C:
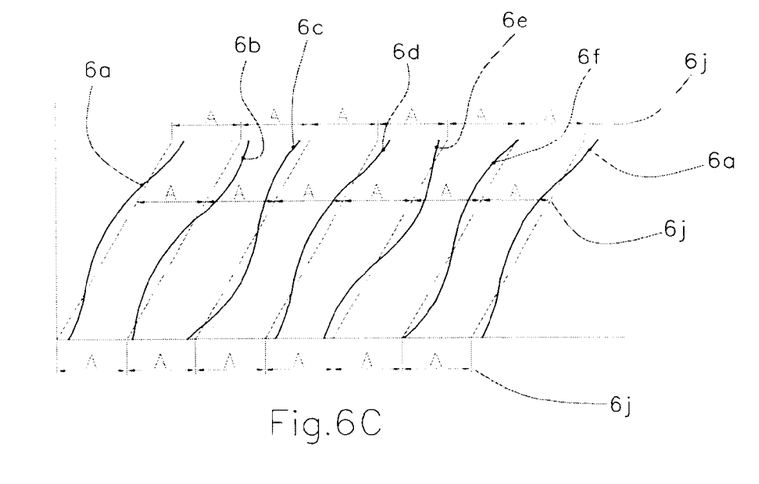
FIG. 6C is a schematic development view of the end mill of FIG. 6A showing the disposition of circumferential cutting edges on the developed cutting surface.
Figures 7A, 7B:
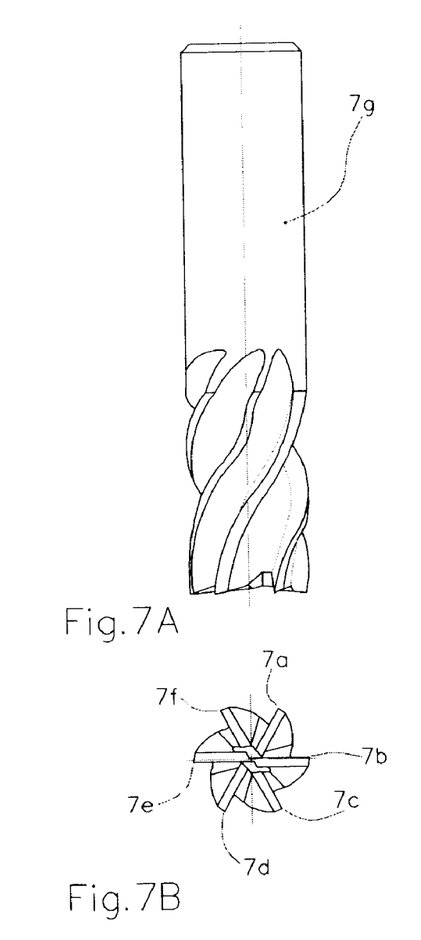
FIG. 7A is a side elevation view of an end mill according to a third embodiment of this disclosure with three phased pairs of opposite sinusoidal circumferential cutting edges.
FIG. 7B is an end view of the end mill of FIG. 7A.
Figure 7C:
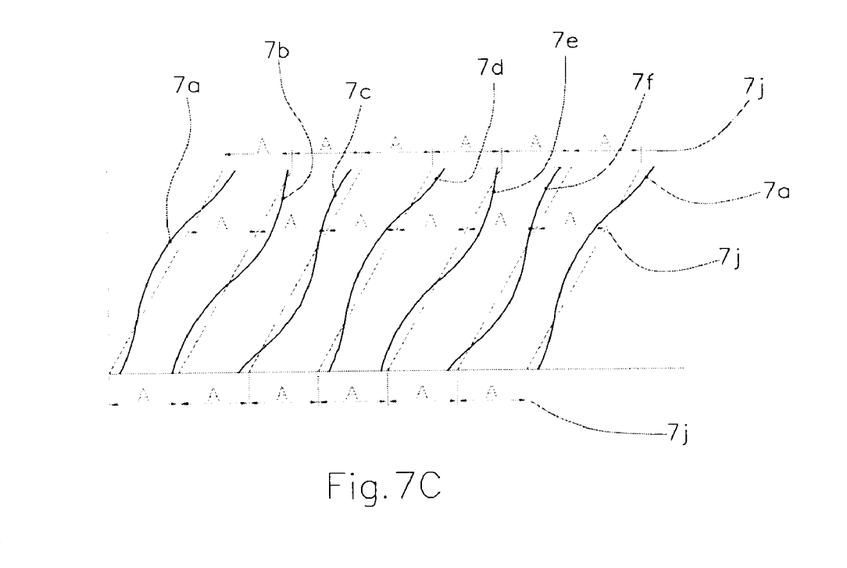
FIG. 7C is a schematic development view of the end mill of FIG. 7A, showing the disposition of circumferential cutting edges on the developed cutting surface.

FIGS. 6A to 6C show another embodiment where the cylindrical tool body 100 has six cutting surfaces 6a to 6f along the fluted cutting end 102. In this embodiment, the plurality of cutting edges 6a to 6f are spaced regularly along the circumferential cutting surface and the first cutting angle of each datum line is constant. This embodiment illustrates a situation where all other cutting edges are staggered from cutting edges 6a and 6d and where the phase shift is irregular between the other cutting edges. FIGS. 7A to 7C illustrate another embodiment where cutting surface 7a in phase with cutting surface 7d and there is no phase shift between any two cutting edges intercepting the periphery at opposite locations about the periphery 104 on each side of the longitudinal central axis 101. It is understood by one of ordinary skill in the art that these embodiments are illustrative of only several of the possible configurations where some degree of symmetry between the cutting edges is needed within the end mill 100.

Figure 8A:
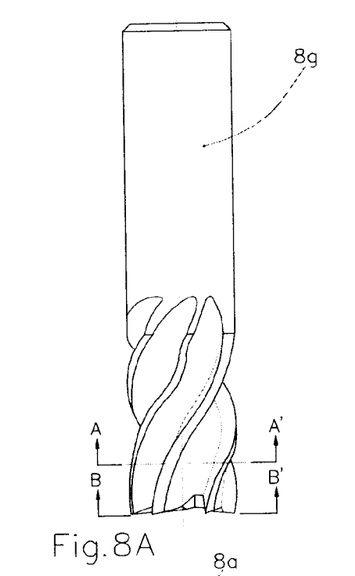
FIG. 8A is a side elevation view of an end mill according to a fourth embodiment of this disclosure with sinusoidal circumferential cutting edges forming an unstaggered plateau contour.
Figure 8B:
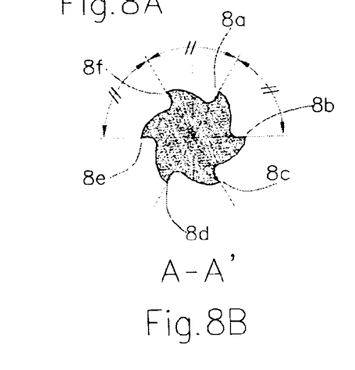
FIG. 8B is a bottom cut view along the plateau A-A' of the end mill of FIG. 8A.
Figures 8C, 8D:
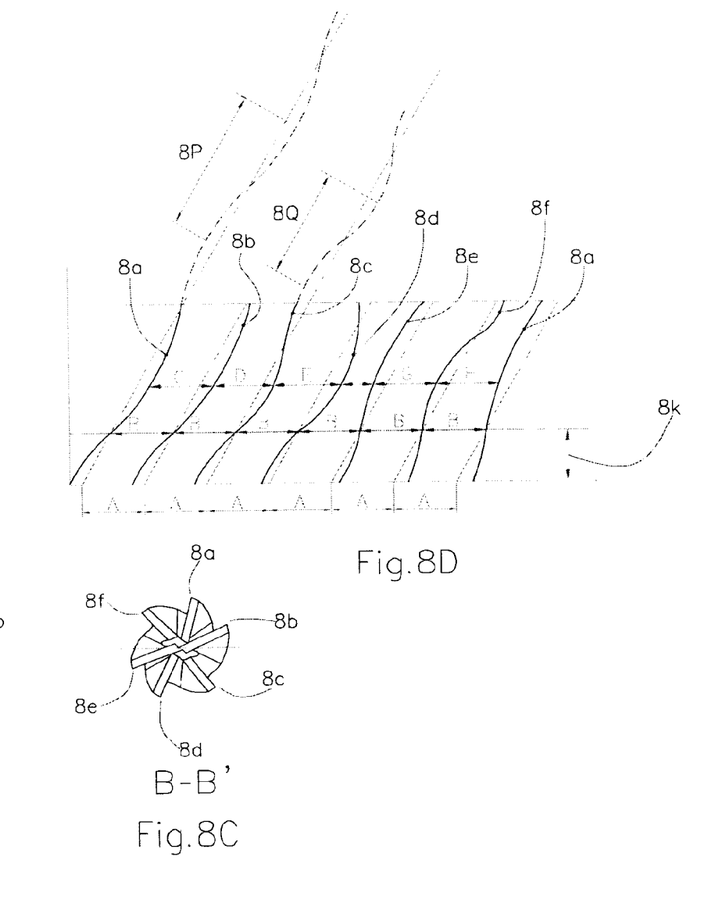
FIG. 8C is an end view along B-B' of the end mill of FIG. 8A.
FIG. 8D is a schematic development view of the end mill of FIG. 8A showing the disposition of circumferential cutting edges on the developed cutting surface.

FIGS. 7A to 7C illustrate an end mill 100 wherein the length of the datum line from the intersection of the datum line with the periphery 104 and the intersection of the datum line with the shank 5e is about the same as the pitch to better illustrate a complete sinusoidal wave placed on the cutting edge and to facilitate comprehension. This disclosure also contemplates the use of a different pitch to modify even further the cutting edge and reduce natural frequencies. FIGS. 8A and 8D show a possible embodiment where the pitch may vary from cutting edge to cutting edge. For example, cutting edge 8a has a pitch 8P and cutting edge 8c has a pitch of 8Q. The use of different pitches in association with different phases at the periphery allows for the creation of a plateau as shown by line A-A on FIG. 8A. The plateau created is parallel to the end surface as shown by line B-B on FIG. 8A and is defined on the cutting surface at a predetermined location between the periphery and the shank. In the fourth embodiment shown as FIGS. 8A to 8C, the datum lines are regularly spaced about the plateau.

Figure 9A:
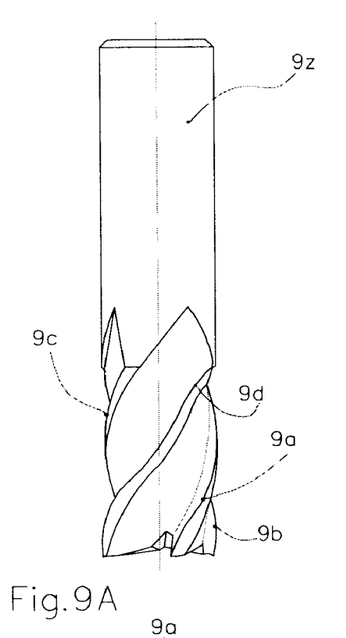
FIG. 9A is a side elevation view of an end mill according to a fifth embodiment of this disclosure with a varied first cutting angle and a sinusoidal circumferential cutting edge.
Figure 9B:
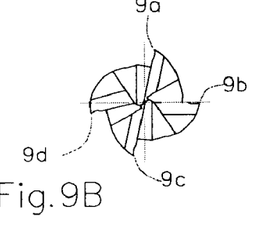
FIG. 9B is an end view of the end mill of FIG. 9A.
Figure 9C:
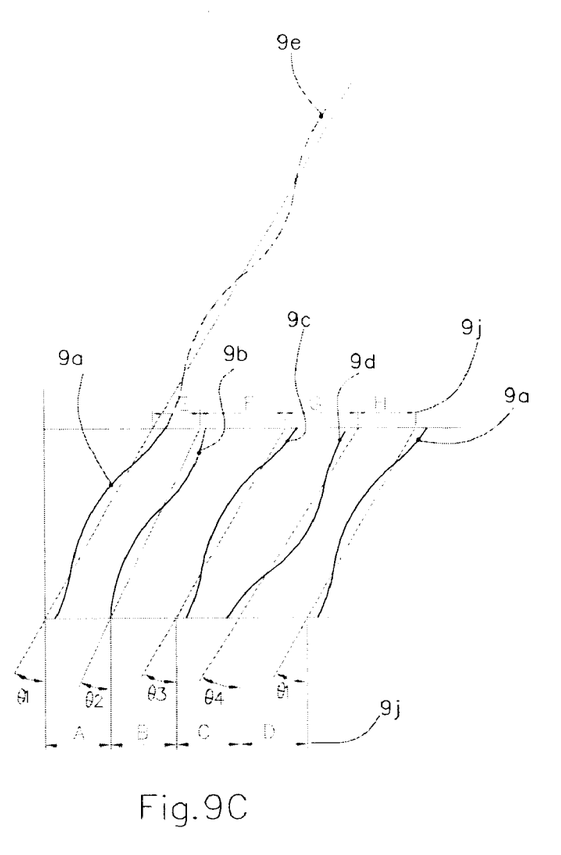
FIG. 9C is a schematic development view of the end mill of FIG. 9A showing the disposition of circumferential cutting edges on the developed cutting surface.

FIGS. 9A to 9C illustrate a situation where the first cutting angles θ1 to θ4 may vary from cutting edge to cutting edge and the disposition of the circumferential cutting edges on the developed cutting surface may also vary (shown as distances A to H). In another possible embodiment, it is contemplated that either the upper (shown as distances E to H) or lower distances (shown as distances A to D) may be regular. But when associated with a varying first cutting angle, the associated distances located a the other end of the fluted end may be irregular.

Figure 10A:
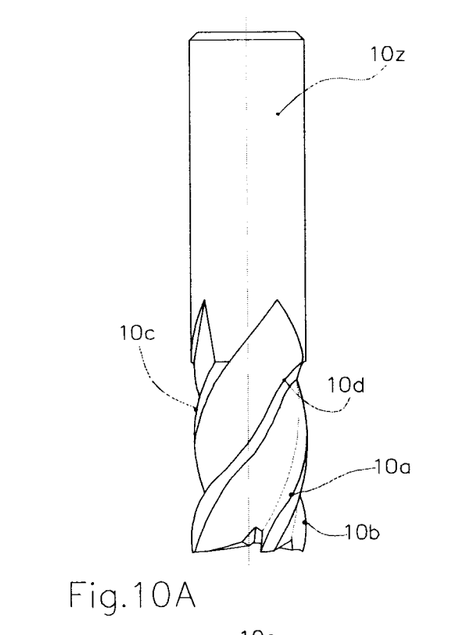
FIG. 10A is a side elevation view of an end mill according to a sixth embodiment of this disclosure with unequally spaced datum lines of sinusoidal circumferential cutting edges.
Figure 10B:
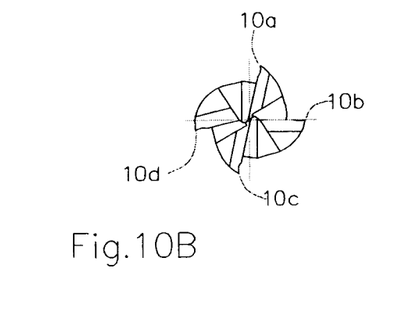
FIG. 10B is an end view of the end mill of FIG. 10A.
Figure 10C:
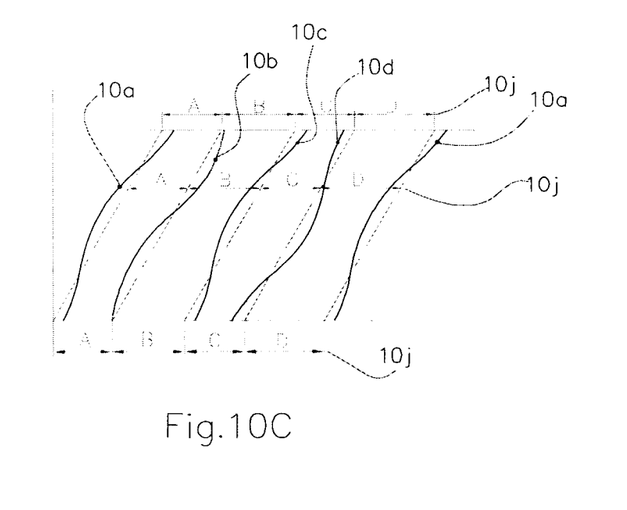
FIG. 10C is a schematic development view of the end mill of FIG. 10A showing the disposition of circumferential cutting edges on the developed cutting surface.

Finally, FIGS. 10A to 10C show a configuration similar to FIGS. 5A to 5C with variably spaced datum lines on the cutting surface. It is apparent to one of ordinary skilled in the art that, based on the prior disclosed unique properties of a circumferential sinusoidal wave cutting edge, a plurality of configurations may be conceived where the first cutting angle, the datum line spacing, the pitch, and the phase shift are modified. This disclosure illustrates only a couple possible embodiments, but others are contemplated, such as one where each datum line is irregularly spaced about the circumferential cutting surface from each adjacent datum line, one where each datum line of alternate cutting edges is regularly spaced about the circumferential cutting surface from each alternate datum line, one where the first cutting angle on the circumferential cutting surface is different for each cutting edge, one where the first cutting edge on the circumferential cutting surface of alternate cutting edges is constant, one where the circumferential amplitude is different for each cutting edge, or one where the circumferential amplitude is constant for each alternate cutting edge. It is readily understood that by varying these parameters when associated with a circumferential sinusoidal wave cutting edge, other configurations are possible and contemplated.

It is understood that the preceding is merely a detailed description of some examples and embodiments of the present invention and that numerous changes to the disclosed embodiments can be made in accordance with the disclosure herein without departing from the spirit or scope of the invention. The preceding description, therefore, is not meant to limit the scope of the invention but to provide sufficient disclosure to one of ordinary skill in the art to practice the invention without undue burden.

What is claimed is:

1. An end mill, comprising:
   a cylindrical tool body having a longitudinal central axis, the cylindrical tool body rotatable about the longitudinal central axis;
   a fluted cutting end and a shank end integrally formed in the cylindrical tool body in opposition, the shank end having a shank extending along the longitudinal central axis, the fluted cutting end defining a circumferential cutting surface extending along the longitudinal central axis of rotation adjacent to the shank;
   wherein the circumferential cutting surface further comprises a plurality of circumferentially spaced cutting edges, each cutting edge extending generally along a datum line, the datum line oriented at a first cutting angle on the circumferential cutting surface,
   wherein the first cutting angle is defined on the cutting surface between the projection of the longitudinal central axis and the datum line, and
   wherein each cutting edge is located on a contour centered about the datum line in the shape of a single pitch of a single sinusoidal wave.

2. The end mill of claim 1, wherein each datum line is regularly spaced about the circumferential cutting surface from each adjacent datum line.

3. The end mill of claim 1, wherein each datum line is irregularly spaced about the circumferential cutting surface from each adjacent datum line.

4. The end mill of claim 1, wherein each datum line of alternate cutting edges are regularly spaced about the circumferential cutting surface from each alternate datum line.

5. The end mill of claim 1, wherein the first cutting angle on the circumferential cutting surface is constant for each cutting edge.

6. The end mill of claim 1, wherein the first cutting angle on the circumferential cutting surface is different for each cutting edge.

7. The end mill of claim 1, wherein the first cutting angle on the circumferential cutting surface of alternate cutting edges is constant.

8. The end mill of claim 1, wherein the contour centered about the datum line is further defined by a circumferential amplitude of the cutting edge to the datum line, and where the circumferential amplitude is constant for each cutting edge.

9. The end mill of claim 1, wherein the contour centered about the datum line is further defined by a circumferential amplitude of the cutting edge from the datum line, and where the circumferential amplitude is different for each cutting edge.

10. The end mill of claim 1, wherein the contour centered along the datum line is further defined by a circumferential amplitude of the cutting edge from the datum line, and where the circumferential amplitude is constant for each alternate cutting edge.

11. An end mill, comprising:
    a cylindrical tool body having a longitudinal central axis oriented, the cylindrical tool body rotatable about the longitudinal central axis;
    a fluted cutting end and a shank end integrally formed in the cylindrical tool body in opposition, the fluted cutting end having a nose, a periphery, and an end surface extending from the nose to the periphery, the shank end having a shank extending along the longitudinal central axis, the fluted cutting end defining a circumferential cutting surface extending along the longitudinal central axis of rotation adjacent to the shank, and the end surface having a radial cutting surface extending along a perpendicular plane to the longitudinal central axis;
    wherein the circumferential cutting surface further comprises a plurality of circumferentially spaced cutting edges, each cutting edge extending generally along a datum line, the datum line oriented at a first cutting angle on the circumferential cutting surface,
    wherein the first cutting angle is on the cutting surface between the projection of the longitudinal axis and the datum line, and
    wherein each cutting edge is located on a contour centered about the datum line in the shape of a single pitch of a single sinusoidal wave, and the single sinusoidal wave is staggered in relation to neighboring circumferentially spaced cutting edges along a phase shift.

12. The end mill of claim 11, wherein there is no phase shift between a pair of cutting edges intercepting the periphery at opposite locations about the periphery on each side of the longitudinal central axis.

13. The end mill of claim 11, wherein there is no phase shift between any two cutting edges intercepting the periphery at opposite locations about the periphery on each side of the longitudinal central axis.

14. An end mill, comprising:
    a cylindrical tool body having a longitudinal central axis oriented, the cylindrical tool body rotatable about the longitudinal central axis;
    a fluted cutting end and a shank end integrally formed in the cylindrical tool body in opposition, the fluted cutting end having a nose, a periphery, and an end surface extending from the nose to the periphery, the shank end having a shank extending along the longitudinal central axis, the fluted cutting end defining a circumferential cutting surface extending along the longitudinal central axis of rotation adjacent to the shank, and the end surface having a radial cutting surface extending along a perpendicular plane to the longitudinal central axis;
    wherein the circumferential cutting surface further comprises a plurality of circumferentially spaced cutting edges, each cutting edge extending generally along a datum line, the datum line oriented at a first cutting angle on the circumferential cutting surface, wherein the first cutting angle is on the cutting surface between the projection of the longitudinal axis and the datum line, and wherein each cutting edge is located on a contour centered about the datum line in the shape of a single pitch of a single sinusoidal wave and the single sinusoidal wave is staggered in relation to neighboring circumferentially spaced cutting edges along a phase shift, and the length of the datum line from the intersection of the datum line with the periphery to the intersection of the datum with the shank is less than the pitch of the sinusoidal wave.

15. The end mill of claim 14, wherein there is no phase shift between a pair of cutting edges intercepting the periphery at opposite locations about the periphery on each side of the longitudinal central axis.

16. The end mill of claim 14, wherein there is no phase shift between any two cutting edges intercepting the periphery at opposite locations about the periphery on each side of the longitudinal central axis.

17. The end mill of claim 14, wherein each datum line is regularly spaced about the circumferential cutting surface from each adjacent datum line.

18. The end mill of claim 14, wherein each datum line is irregularly spaced about the circumferential cutting surface from each adjacent datum line.

19. The end mill of claim 14, wherein each datum line of alternate cutting edges on are regularly spaced about the circumferential cutting surface from each alternate datum line.

20. The end mill of claim 14, wherein the first cutting angle on the circumferential cutting surface is constant for each cutting edge.

21. The end mill of claim 14, wherein the first cutting angle on the circumferential cutting surface is different for each cutting edge.

22. The end mill of claim 14, wherein the first cutting angle on the circumferential cutting surface of alternate cutting edges is constant.

23. The end mill of claim 14, wherein the contour centered about the datum line is further defined by a circumferential amplitude of the cutting edge to the datum line, and where the circumferential amplitude is constant for each cutting edge.

24. The end mill of claim 14, wherein the contour centered about the datum line is further defined by a circumferential amplitude of the cutting edge from the datum line, and where the circumferential amplitude is different for each cutting edge.

25. The end mill of claim 14, wherein the contour centered along the datum line is further defined by a circumferential amplitude of the cutting edge from the datum line, and where the circumferential amplitude is constant for each alternate cutting edge.

26. An end mill, comprising:
a cylindrical tool body having a longitudinal central axis, the cylindrical tool body rotatable about the longitudinal central axis;
a fluted cutting end and a shank end integrally formed in the cylindrical tool body in opposition, the fluted cutting end having a nose, a periphery, and an end surface extending from the nose to the periphery, and a plateau parallel to the end surface, the shank end having a shank extending along the longitudinal central axis, the fluted cutting end defining a circumferential cutting surface extending along the longitudinal central axis of rotation adjacent to the shank, and where the plateau is defined on the cutting surface at a pre-selected location between the periphery and the shank;

wherein the circumferential cutting surface further comprises a plurality of circumferentially spaced cutting edges, each cutting edge extending generally along a datum line, the datum line oriented at a first cutting angle between the circumferential cutting surface, wherein the first cutting angle is on the cutting surface between the projection of the longitudinal axis and the datum line, wherein each cutting edge is located along a single sinusoidal wave shape centered along the datum line and the length of the datum line from the intersection of the datum line with the periphery to the intersection of the datum with the shank being less than a single pitch of the single sinusoidal wave, wherein the cutting edges and the datum lines are regularly spaced about the plateau.

27. The end mill of claim 26, wherein the pitch of each sinusoidal wave shape on each cutting edge is different.

28. The end mill of claim 26, wherein the contour centered about the datum line is further defined by a circumferential amplitude of the cutting edge from the datum line, and where the circumferential amplitude is different for each cutting edge.

29. The end mill of claim 26, wherein each datum line is regularly spaced about the circumferential cutting surface from each adjacent datum line.

30. The end mill of claim 26, wherein each datum line is irregularly spaced about the circumferential cutting surface from each adjacent datum line.

31. The end mill of claim 26, wherein each datum line of alternate cutting edges on are regularly spaced about the circumferential cutting surface from each alternate datum line.

32. The end mill of claim 26, wherein the first cutting angle on the circumferential cutting surface is constant for each cutting edge.

33. The end mill of claim 26, wherein the first cutting angle on the circumferential cutting surface is different for each cutting edge.

34. The end mill of claim 26, wherein the first cutting angle on the circumferential cutting surface of alternate cutting edges is constant.

35. The end mill of claim 26, wherein the contour centered about the datum line is further defined by a circumferential amplitude of the cutting edge to the datum line, and where the circumferential amplitude is constant for each cutting edge.

36. The end mill of claim 26, wherein the contour centered about the datum line is further defined by a circumferential amplitude of the cutting edge from the datum line, and where the circumferential amplitude is different for each cutting edge.

37. The end mill of claim 26, wherein the contour centered along the datum line is further defined by a circumferential amplitude of the cutting edge from the datum line, and where the circumferential amplitude is constant for each alternate cutting edge.

* * * * *